(12) United States Patent
Van Kerkhoven et al.

(10) Patent No.: US 8,033,471 B2
(45) Date of Patent: Oct. 11, 2011

(54) OPTICAL IMAGE READER

(75) Inventors: Don Van Kerkhoven, Kanata (CA); Pierre Deguire, Kanata (CA); Xinjun Xie, Ottawa (CA)

(73) Assignee: Psion Teklogix Inc., Mississauga (CA)

( * ) Notice: Subject to any disclaimer, the term of this patent is extended or adjusted under 35 U.S.C. 154(b) by 0 days.

(21) Appl. No.: 12/117,450

(22) Filed: May 8, 2008

(65) Prior Publication Data

US 2009/0277963 A1 Nov. 12, 2009

(51) Int. Cl.
*G06K 7/10* (2006.01)
(52) U.S. Cl. ......... 235/462.41; 235/462.24; 235/462.21
(58) Field of Classification Search .................. 235/454, 235/462.42
See application file for complete search history.

(56) References Cited

U.S. PATENT DOCUMENTS

| | | | |
|---|---|---|---|
| 5,331,176 A * | 7/1994 | Sant' Anselmo et al. ..... 250/566 |
| 6,066,857 A | 5/2000 | Fantone et al. |
| 6,073,851 A * | 6/2000 | Olmstead et al. ........ 235/462.45 |
| 6,098,887 A | 8/2000 | Figarella et al. |
| 6,119,939 A | 9/2000 | Schwartz et al. |
| 6,164,544 A | 12/2000 | Schwartz et al. |
| 6,275,388 B1 | 8/2001 | Hennick et al. |
| 6,371,374 B1 | 4/2002 | Schwartz et al. |
| 6,474,837 B1 * | 11/2002 | Belliveau ...................... 362/231 |
| 7,090,132 B2 | 8/2006 | Havens et al. |
| 7,163,150 B2 * | 1/2007 | Kricorissian et al. .... 235/462.21 |
| 7,201,318 B2 | 4/2007 | Craen |
| 7,264,162 B2 | 9/2007 | Barkan |
| 7,296,749 B2 | 11/2007 | Massieu |
| 7,304,290 B2 | 12/2007 | Kricorissian et al. |
| 7,533,824 B2 | 5/2009 | Hennick et al. |
| 2002/0125322 A1 * | 9/2002 | McCall et al. ........... 235/462.42 |
| 2004/0101168 A1 * | 5/2004 | Kostrzewski et al. ........ 382/115 |
| 2005/0199720 A1 | 9/2005 | Barkan |
| 2005/0199725 A1 | 9/2005 | Craen et al. |
| 2005/0218231 A1 | 10/2005 | Massieu |
| 2006/0054779 A1 | 3/2006 | Kricorissian |
| 2006/0255147 A1 | 11/2006 | Havens et al. |
| 2007/0063048 A1 | 3/2007 | Havens et al. |
| 2007/0108284 A1 * | 5/2007 | Pankow et al. ................ 235/454 |
| 2007/0216909 A1 | 9/2007 | Everett et al. |

(Continued)

FOREIGN PATENT DOCUMENTS
CA 2 343 326 A1 3/2000
(Continued)

*Primary Examiner* — Seung Lee
*Assistant Examiner* — Sonji Johnson
(74) *Attorney, Agent, or Firm* — Pearne & Gordon LLP

(57) ABSTRACT

An optical image reader is provided. The image reader includes, for example, a targeting system for an imager, which includes a light device having a plurality of light emitting diodes (LEDs), each for emitting light, and a device for shaping a single targeting light based on the outputs of the plurality of LEDs. The image reader includes, for example, an image system for capturing image of an indicia on an object, which includes a targeting light source for providing a targeting light to the indicia on the object; and an optical system for focusing reflection from the object, having a liquid focus lens element having a variable focus, and a controller for controlling the focus of the focus lens. The image reader includes, for example, a system for capturing an image of an indicia on an object, which includes an image sensor for sensing reflection from the object, and an ambient light sensor for sensing the reflection from the object prior to the sensing by the image sensor to calculate a first estimate for exposure of the image sensor.

16 Claims, 16 Drawing Sheets

U.S. PATENT DOCUMENTS

| | | |
|---|---|---|
| 2007/0291277 A1 | 12/2007 | Everett et al. |
| 2008/0023552 A1 | 1/2008 | Gillet et al. |
| 2008/0100612 A1 | 5/2008 | Dastmalchi et al. |
| 2008/0128511 A1 | 6/2008 | Schwartz et al. |
| 2009/0166426 A1* | 7/2009 | Giebel et al. ............. 235/462.42 |
| 2009/0242641 A1* | 10/2009 | Blasczak ................... 235/462.1 |
| 2011/0007298 A1* | 1/2011 | Smith et al. .................... 355/77 |

FOREIGN PATENT DOCUMENTS

| | | |
|---|---|---|
| CA | 2 347 420 A1 | 3/2000 |
| GB | 2411998 | 9/2005 |
| WO | 2005073895 A1 | 8/2005 |

* cited by examiner

OPTICAL IMAGE READER

FIELD OF INVENTION

The present invention relates to optical devices, and more specifically to a system for image-reading an indicia on the object.

BACKGROUND OF THE INVENTION

Handheld imagers are well known in the art. The imagers typically include a targeting system having a light source for illuminating a target object, an image sensor for sensing reflection from the object, and a signal processor for processing the output from the image sensor.

Considerable effort has been made into the handheld imagers. However, many issues still remain with regard to, for example, response time, power consumption, quality of imagers.

SUMMARY OF THE INVENTION

It is an object of the invention to provide a method and system that obviates or mitigates at least one of the disadvantages of existing systems.

According to an aspect of the present invention there is provided a targeting system for an imager. The targeting system includes a light device having a plurality of light emitting diodes (LEDs), each for emitting light. The targeting system includes a device for shaping a single targeting light based on the outputs of the plurality of LEDs.

According to another aspect of the present invention there is provided an image system for capturing image of an indicia on an object. The image system includes a targeting light source for providing a targeting light to the indicia on the object, and an optical system for focusing reflection from the object. The optical system includes a liquid focus lens element having a variable focus, and a controller for controlling the focus of the focus lens.

According to a further aspect of the present invention there is provided a system for capturing an image of a barcode on an object. The system includes an image sensor for sensing reflection from the object, and an ambient light sensor for sensing the reflection from the object prior to the sensing by the image sensor to calculate a first estimate for exposure of the image sensor.

According to a further aspect of the present invention there is provided a barcode reader, which includes a light source for providing a light to an object having a barcode, an objective lens for receiving reflection from the object, and a holographic diffuser for changing the angle of the light source.

BRIEF DESCRIPTION OF THE DRAWINGS

These and other features of the invention will become more apparent from the following description in which reference is made to the appended drawings wherein.

DETAILED DESCRIPTION

Figure 1:
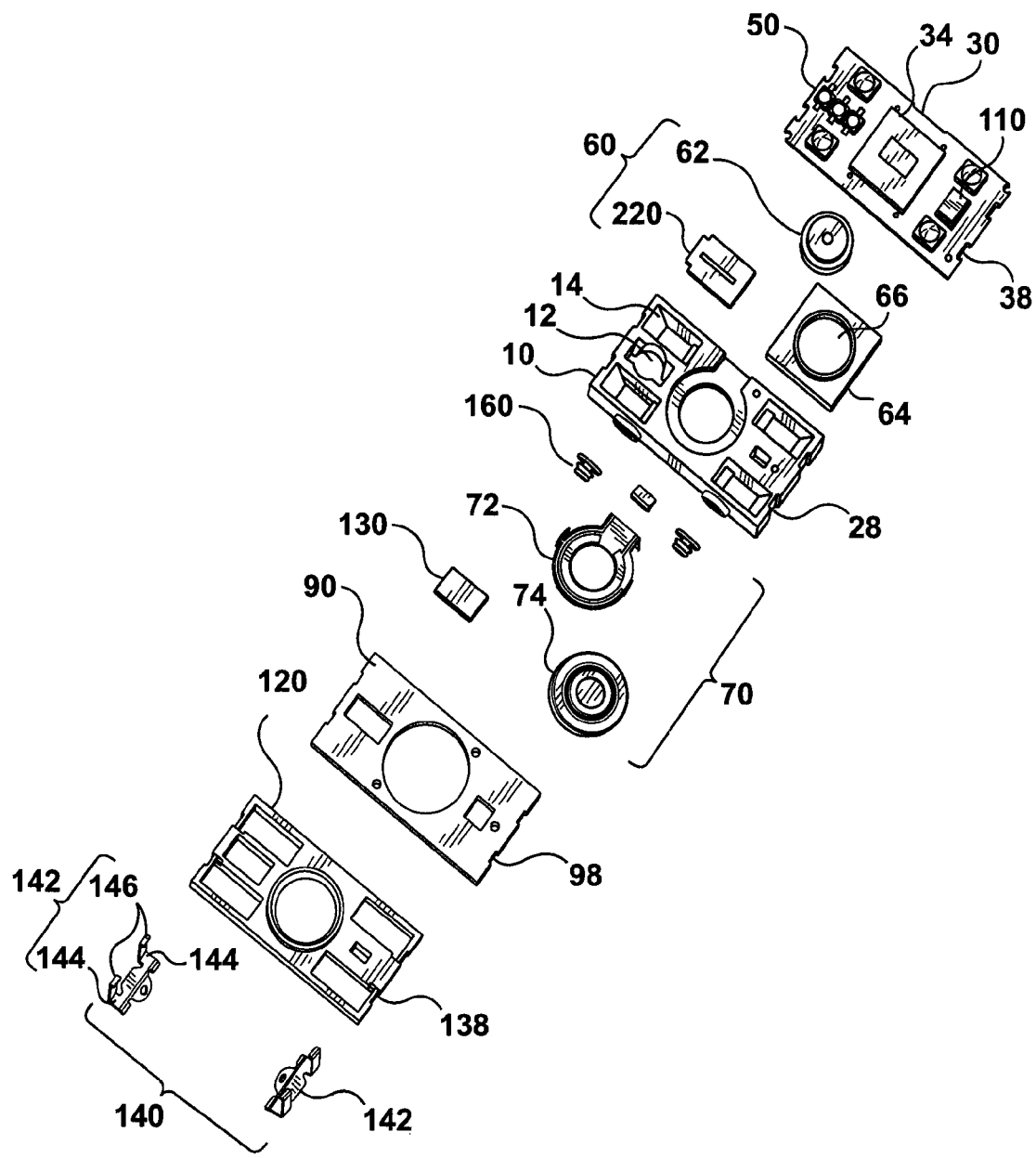
FIG. 1 is an exploded view of an example of an imager in accordance with an embodiment of the present invention.

An example of an imager 2 in accordance with an embodiment of the present invention is shown in FIGS. 1-15. Referring to FIGS. 1-15, the imager 2 has a plurality of components for capturing and reading optical indicia (e.g., bar code, other symbology) on an object. The imager 2 may be a barcode scanner/reader.

The imager's components include a printed circuit board (PCB) assembly 30 having an illumination device for illuminating an object and an image sensor 34 for sensing reflection from the object, a targeting/aiming light device 50, 80 for providing a targeting light to an indicia on the object, a sensor focus lens system 60, 70 for focusing the reflection from the object, an illumination diffuser board 90 for diffusing the illumination, a cylindrical lens 130 for shaping the targeting light, and an ambient light sensor 110 for calculating the first (initial) estimate of exposure for the image sensor 34.

The imager's components further include a housing 10, a front (top) cover panel 120 and a binding system 140 for assembling. The front side of the housing 10 is formed to assemble the focus lens system 70, the illumination diffuser board 90, the cylindrical lens 130, and the front panel 120. The rear side of the housing 10 is formed to assemble the focus lens system 60 and the PCB assembly 30.

The imager 2 can alternatively accommodate either a LED array 50 or a laser assembly 80 as the targeting/aiming light device, in order to improve targeting/aiming. The LED array 50 includes a plurality of LEDs 52 that are mounted on the PCB 32 of the PCB assembly 30 and form a linear LED array. In this example, three LEDs 52 form the LED array 50, however, the number of LEDs and its shape may vary. The laser assembly 80 includes, for example, a laser diode, collimating lens and driver.

The targeting/aiming system of the imager 2 includes one or more post lens apertures (e.g., 222 of FIG. 6, 122 of FIG. 11) to sharpen ends (define edge) and prevent fade-off phenomenon. The post lens aperture is formed so that a desired targeting/aiming pattern (light) is projected onto a target. In this example, the post lens aperture is a single shaping slot or has a rectangular shape to project a horizontal line onto the target. In this example, a horizontal line (e.g., red line) light is provided by either the LED array 50 or the laser assembly 80.

The imager 2 can also alternatively accommodate either a focus lens element system 60 or a focus lens element system 70, as the sensor focus lens system. In this example, the focus lens system 60 includes a multi-element achromatic lens element (62) with a certain fixed lens focus. In this example, the focus lens system 70 includes a fluid (liquid) lens element (74) with a variable lens focus. The imager 2 can use two different image optics (62, 74) for best-focusing target indicia onto the image sensor 34.

The illumination diffuser 90 smoothes lighting from the illumination device and reduces internal reflections. The ambient light sensor 110 is used to speed exposure convergence for the image sensor 34 and get faster response time.

In the description below, "focus lens (element) system 60" may be referred to as "fixed focus lens element system 60". In the description below, the lens of the focus lens system 60 (i.e., the multi-element achromatic lens) may be referred to as "fixed focus lens". In the description below, the terms "variable focus lens", "fluid (focus) lens" and "liquid (focus) lens" are used interchangeably. In the description below, the terms "illumination diffuser", "illumination diffuser board" and "illumination diffuser panel" are used interchangeably. In the description below, the terms "front panel", "top panel" and "cover panel" may be used interchangeably.

Each of the housing 10, the PCB assembly 30, the illumination diffuser board 90 and the front panel 120 has one or more receiving sections (e.g., hollows, recesses, cut sections) in each side. These components are securely assembled by snapping or clipping the receiving sections with the binding system 140. In the embodiment, two hollows (e.g., 28, 38, 98, 138) are shown for each side as the receiving sections, however, the number of the hollows for each side may vary.

The method of assembling the components are described below. The construction of the imager 2 allows many variants without retooling. There are a plurality of options, for examples, for changing the cylindrical lens 130 for the LED array 50 or the laser 80, changing the illumination diffuser 90 for light control, assembling with either the multi-element achromatic lens (60) only or the liquid lens (70).

A control circuitry is provided to control the imager 2. The functionality of the control circuitry includes, for example, controlling the current and hence intensity for the LED array 50, ambient light conditions and power restrictions The control circuitry may be integrated into the PCB assembly 30 (e.g., FIG. 16). A signal processor 500 (FIG. 15) for processing data obtained by the imager 2 may be part of a separate external device, such as a Personal Digital Assistant (PDA). In this case, there are control algorithms that may run in either location. Any circuits for transferring data from the PCB assembly 30 to an external device and receiving data from the external device may be located on the PCB assembly 30.

The imager 2 provides greater operation range and functionally forms a single imager product (small barcode feature nearby to picture at distance). The imager 2 ensures faster response for the user and more efficient power consumption. The imager 2 ensures greater usability as it can respond and adapt faster.

The housing 10 is a box shaped housing. The housing 10 has a plurality of receiving sections (e.g., hollows, recesses, cut sections, holes) for mounting/installing the PCB assembly 30, the focus lens systems 60 and 70, the illumination diffuser board 90, the cylindrical lens 130, and the front panel 120. Brass inserts 160 are used to fasten screws and are assembled to the housing 10.

Figure 7:
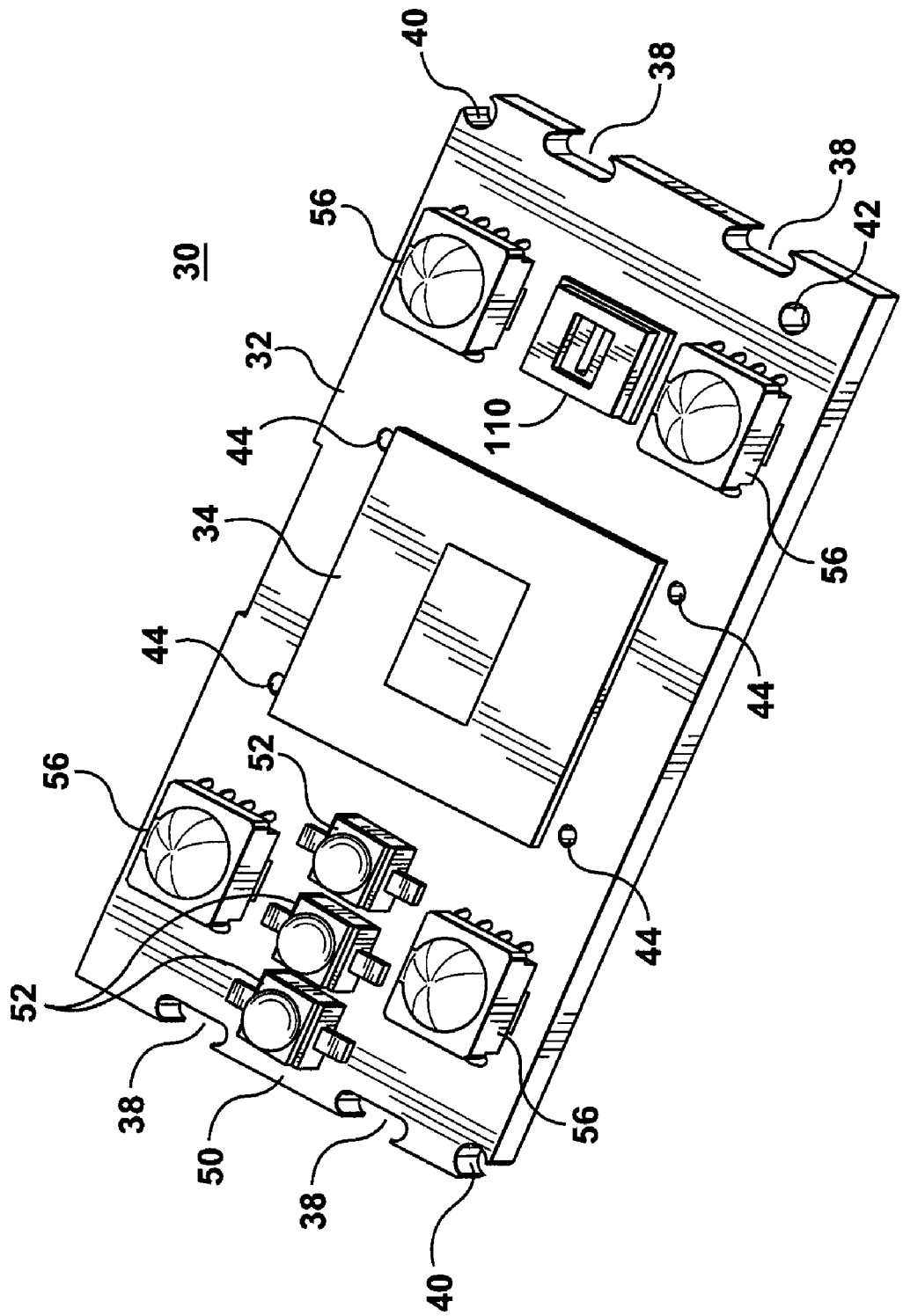
FIG. 7 is a perspective view of a PCB assembly for the imager of FIG. 1.

The rear side of the housing 10 is concaved to receive the PCB assembly 30. The rear side of the housing 10 has one or more pegs 210 (FIGS. 3, 4 and 6) that match one or more receiving sections (e.g., holes, hollows, recesses, cut sections) formed in the PCB 32 of the PCB assembly 30. In this example, the pegs 210 fit over the receiving sections 40 and 42 of the PCB 32 (FIG. 7).

Figure 2:
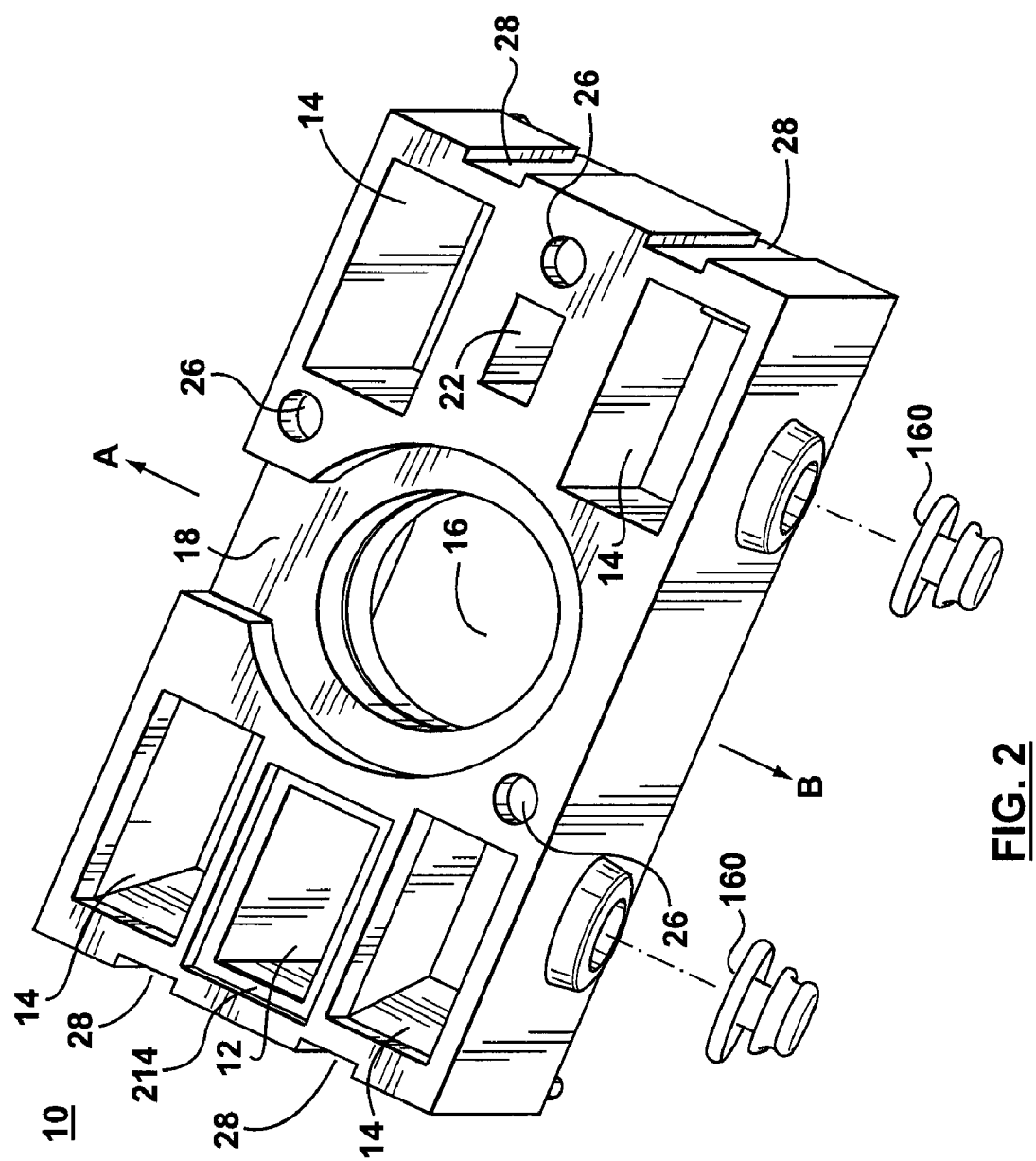
FIG. 2 is a perspective front view of a housing for the imager of FIG. 1.
Figure 3:
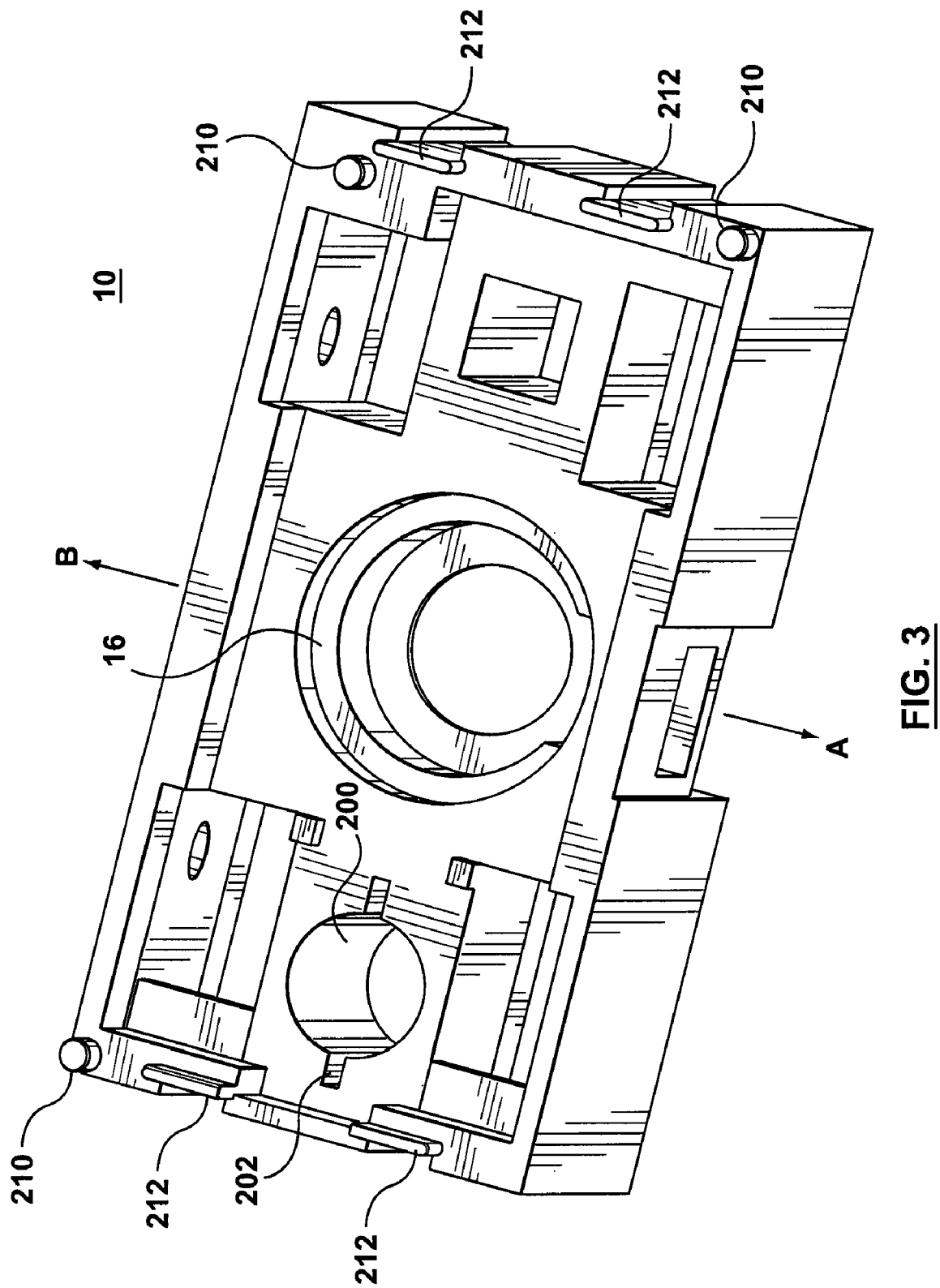
FIG. 3 is a perspective rear view of the housing for the imager of FIG. 1.
Figure 4:
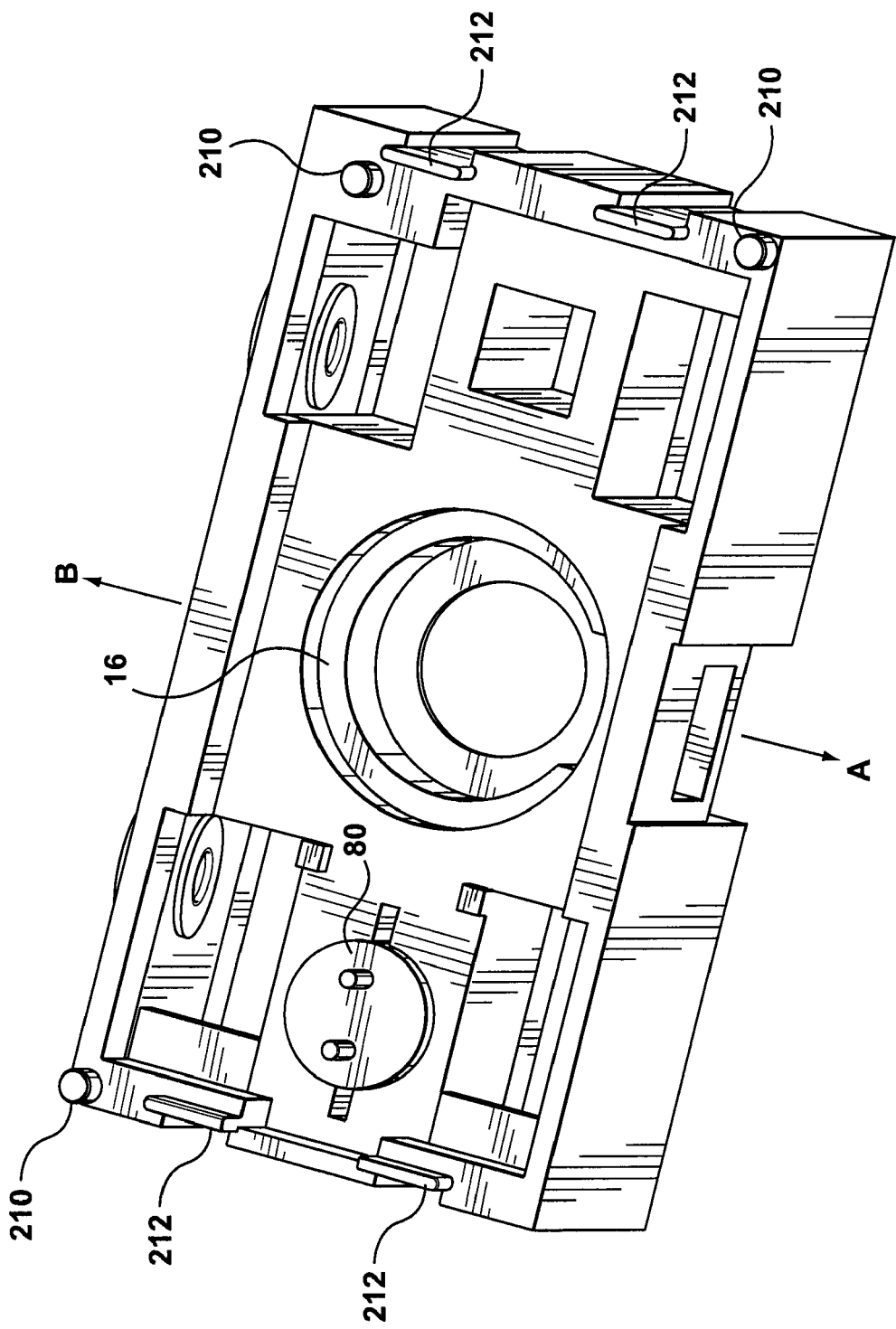
FIG. 4 is a perspective rear view of the housing with a laser for the imager of FIG. 1.
Figure 5:
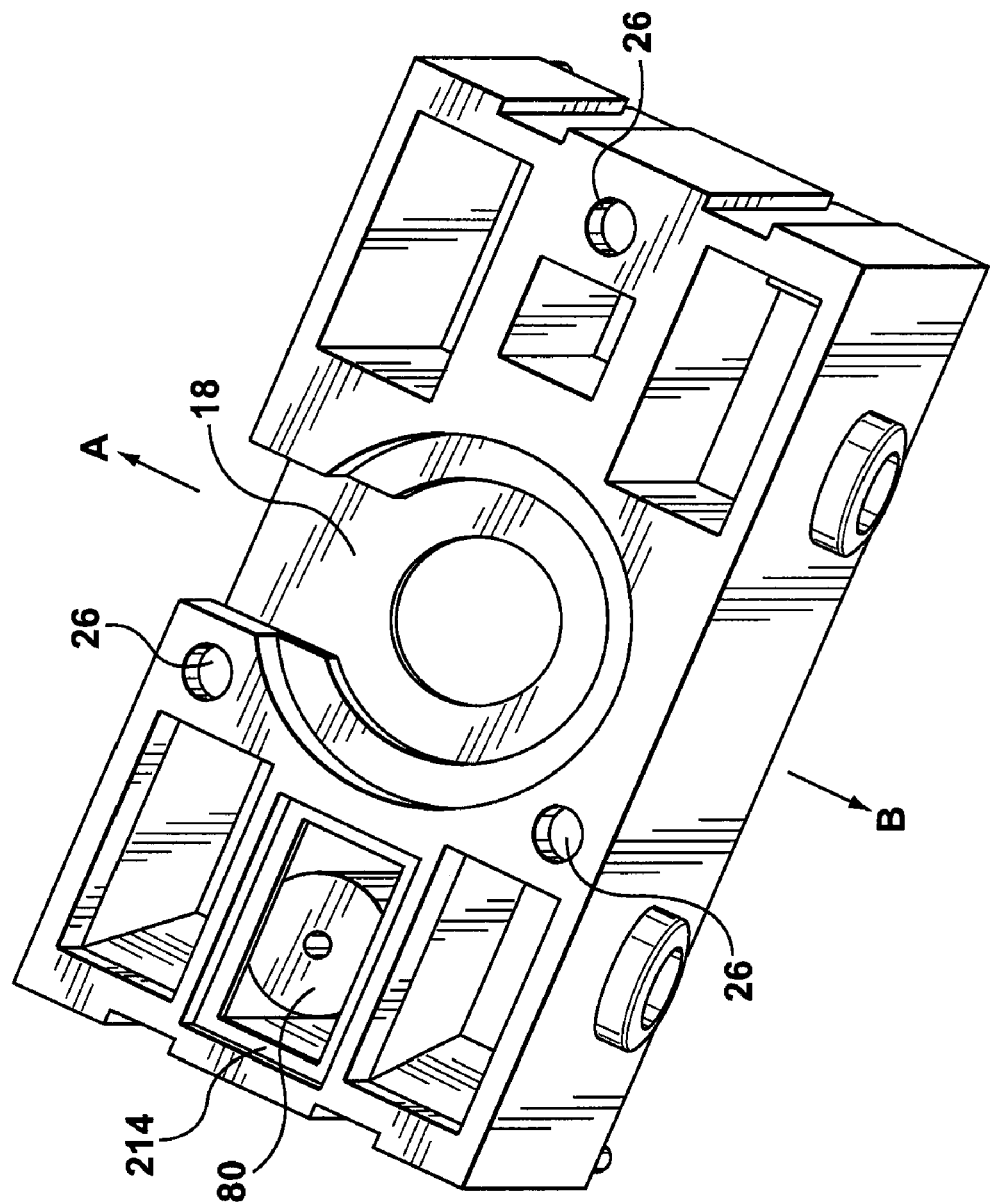
FIG. 5 is a perspective front view of the housing with the laser for the imager of FIG. 1.
Figure 6:
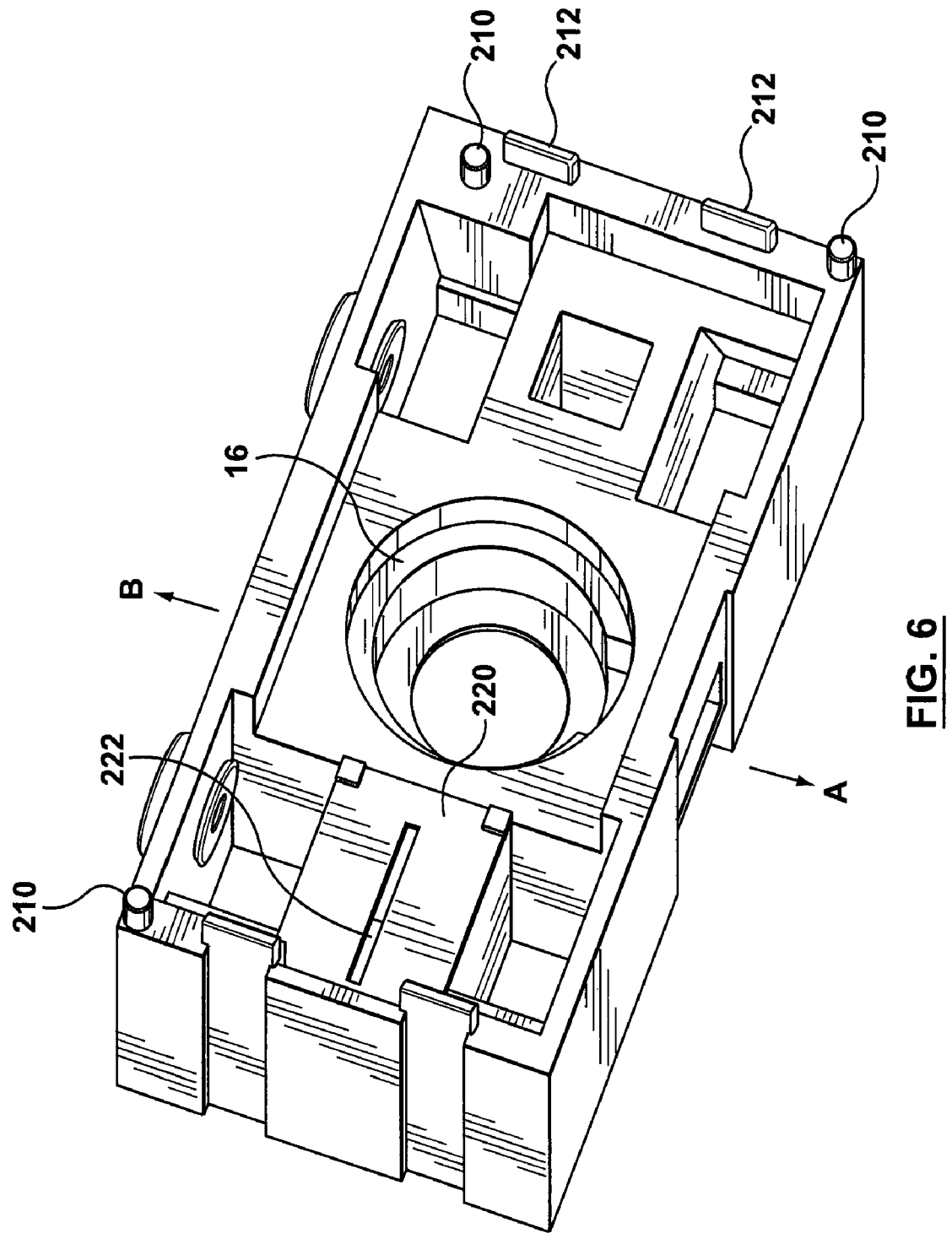
FIG. 6 is a perspective rear view of the housing with a LED aperture for the imager of FIG. 1.

The front side of the housing 10 has holes 26 (FIGS. 2 and 5). The holes 26 are aligned to holes 100 formed in the illumination diffuser board 90 to align the illumination diffuser board 90 to the housing 10. The front side of the housing 10 has a recess 214 over which the cylindrical lens 130 fits.

The housing 10 has receiving sections 16 and 18 for the focus lens systems 60 and 70. The receiving section 16 has an aperture that is capable of receiving the focus lens element system 60. The receiving section 18 has a cavity for receiving the focus lens element system 70. The receiving sections 16 and 18 are aligned with the image sensor 34 when the PCB assembly 30 is assembled with the housing 10.

The housing 10 has an aperture 12 for the LED array 50 and the laser assembly 80. When using the laser assembly 80, an aperture 200 (FIG. 3) is placed at the rear side of the aperture 12. The aperture 200 has an opening for receiving the laser assembly 80. The laser assembly 80 is placed into the housing 10 via the opening 200. When using the LED array 50, a metal aperture plate 220 (FIG. 6) is placed at the rear side of the aperture 12. The metal aperture plate 220 has a slit 222. The slit 222 is aligned with the slit 202 and LED array 50 and sharpens the targeting light from the LED array 50. In this example, the slit 222 has a line shape. The laser assembly 80 connects to the PCB using, for example, two wires. It interfaces directly to the driver that ordinarily controls the targeting LEDs 50.

The housing 10 includes apertures 14 for illumination LEDs 56. When the PCB assembly 30 is assembled with the housing 10, illumination lights from the illumination LEDs 56 pass through the apertures 14.

The housing 10 includes an aperture 22 for the ambient light sensor 110. When the PCB assembly 30 is assembled with the housing 10, the ambient light sensor 110 senses lights from the aperture 22.

Each side of the housing 10 has one or more receiving sections (e.g., hollows, recesses, cut sections) 28 with which the binding system 140 is combined. Fingers 212 (FIGS. 3, 4 and 6) are extended from the receiving sections 28, which match the receiving sections (e.g., hollows, recesses, cut sections) 38 formed in the PCB 32.

The PCB assembly 30 is a signal device on which an imager PCB and an illumination PCB are integrated. The image sensor 34 may be, for example, but not limited to, a 1-D or a 2-D image sensor. The image sensor 34 may be a Video Graphics Array (VGA) image sensor. There are no interboard connectors in the PCB assembly 30. The entire reader is built on a single PCB, eliminating the need (space and cost) of inter-PCB connector(s).

The receiving sections (e.g., hollows, recesses, cut sections) 38 (FIG. 7) in each side of the PCB 32 are used to assemble the PCB 32 with the housing 10. The binding system 140 is attached to the receiving sections 38. The receiving sections (e.g., hollows, recesses, cut sections) 40 and receiving sections (e.g., holes) 42 of the PCB 32 (FIG. 7) are used to align the PCB 32 to the housing 10 so that the image sensor 34 on the PCB assembly 30 is aligned with the multi-element achromatic lens 62 in the housing 10. Receiving sections (e.g., holes) 44 (FIG. 7) are provided to fix the fixed focus lens element system 60 on a right position on the PCB assembly 30.

In another example, the imager PCB and the illumination PCB may be integrated directly using the PDT's housing. In this case, there is no multi-board stack.

The board electronics includes an identification EEPROM, by which software can "auto-discover" imager configuration. In the EEPROM, identifiers for model No., serial No., factory data, mfg date, lens calibration data, temp calibration data and any configuration data are loaded from the factory.

The PCB assembly 30 is connectable to external devices. All discrete I/O controls are integrated onto a bus, for example, I2C bus. Only one single power supply (e.g., 3.3 VDC) is required to operate the imager 2.

The illumination system of the imager 2 includes the illumination LEDs 56, the aperture 14, the illumination diffuser 90 and the aperture 124 of the front panel 120. The illumination LEDs 56 are mounted on the PCB 32 (FIG. 7). In this example, four illumination LEDs 56 are shown, however, the number of the illumination LEDs 56 may vary. The illumination diffuser 90 is aligned to the top cover by the pins on the cover, then assembly of the top cover and the diffuser 90 is assembled to the housing 10. The pins on the top cover are aligned to the holes on the top of the housing 10.

The illumination diffuser 90 is used to increase the illumination angle because the illumination LEDs 56 are recessed from the single board construction and would not provide sufficient coverage.

The illumination diffuser 90 is a light shaping diffuser, and has the thin-film holographic element in this example. The illumination diffuser 90 smoothes and homozenizes light from the illumination LEDs 56 and provides uniform light. The illumination diffuser 90 changes the illumination angles (FOV) such that the LED FOV is changed to match the lens FOV. The angle of the diffuser is chosen in dependence upon lens and the field of view required. This overcomes the problem of having to position or select LEDs to match the lens FOV usually by mechanical placement. The resulting illumination is uniform across the optical FOV.

The illumination diffuser 90 provides even uniform lighting, high efficiency, diffuses hot spots and thus improves reading glossy surfaces The illumination diffuser 90 minimizes the reflective surface to reduce internal secondary reflections from exit window after installation.

In this example, the illumination diffuser 90 is produced by using thin film holographic technology. However, in another example, the illumination diffuser 90 may be formed by using other thin film technologies, for example, but not limited to, polarizers, filters, etc.

Each side of the illumination diffuser board 90 has receiving sections (e.g., hollows, recesses, cut sections) 98 (FIG. 10) with which the binding system 140 is combined. The illumination diffuser board 90 has the alignment holes 100 which are aligned with the holes 26 of the housing 10.

The illumination diffuser board 90 includes apertures 92, 94 and 96 (FIG. 10) for the targeting light device 50, 80, the sensor lens 60, 70, and the ambient light sensor 110, as those components do not require diffusion. The aperture 92 is aligned with the aperture 12 of the housing 10 when the illumination diffuser board 90 is assembled with the housing 10. The aperture 94 is aligned to the focus lens elements 62 or 74 when the focus lens and the illumination diffuser board 90 are assembled with the housing 10. The aperture 96 is aligned to the ambient light sensor 110.

The targeting/aiming system of the imager 2 includes the targeting light device 50, 80, the cylindrical lens 130, and the receiving/shaping parts in or on the housing 10 (e.g., 12, 200, 220) for the targeting light device 50, 80 and the cylindrical lens 130. The aperture 92 of the illumination diffuser board 90 and the aperture 122 of the front panel 120 are formed for the targeting light device 50, 80 and the cylindrical lens 130.

The LED array 50 improves brightness for targeting/aiming. The LED array 50 with the metal aperture plate 220 generates a single bright bar and overcomes a LED center dead spot. The single bright bar generated by the LED array 50 is aligned to the optical horizontal center with less than optical Field Of View (FOV). The cylindrical lens 130 mounted on the housing 10 focuses the light from the LED array 50 to provide a sharp line. The cylindrical lens 130 can be replaced for changing the line characteristics.

The LED array 50 with the metal aperture plate 220 is useful for close barcode ranges, for example, but not limited to, for dispersion of the light<0.5 m. The intensity of the LED array 50 is varied by the control circuitry described above, thus extra bright can be provided in high light conditions and power saving can be done under normal office light conditions.

The laser assembly 80 generates a continuous line (not dots), which mimics laser scanner line. The continuous line is aligned to the optical horizontal center with less than the optical FOV. The cylindrical lens 130 mounted on the housing 10 focuses the light from the laser assembly 80 to provide a sharp line. The cylindrical lens 130 can be replaced for changing the line characteristics.

The continuous line generated by the laser assembly 80 is viewable under daylight environment. For example, the laser targeting system of the imager 2 is useful for farther distances than LED (e.g., <2 m).

The focus lens element 62 includes a lens barrel in which the multi-element achromatic lens is packaged, and a lens holder 64 for holding the lens barrel. The lens barrel for the multi-element achromatic lens may be a metal barrel or a plastic barrel and the lens elements may be glass or plastic. The focus lens element 62 is placed into the aperture 66 of the lens holder 64. The lens barrel of the focus lens element 62 is, for example, threaded into the aperture 16 of the housing 10. The lens holder 64 is fixed to the board with adhesive, or heat stake, or fasteners. Alignment is provided by a plurality of pins (e.g., 4 pins), which match a plurality of holes (e.g., 4 holes) 44 in the PCB 32 (FIG. 7).

Figure 8:
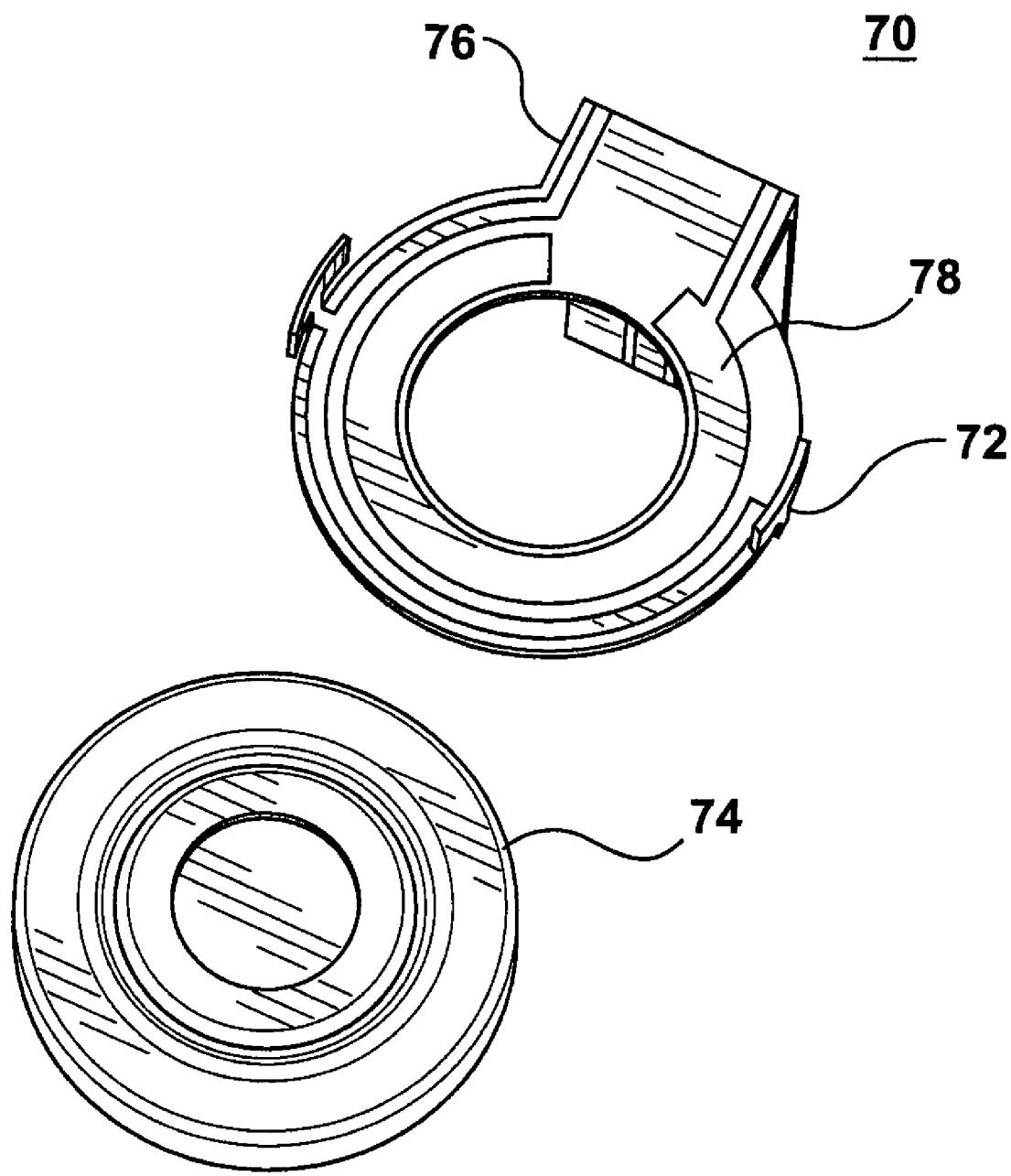
FIG. 8 is a perspective view of a variable focus lens element system for the imager of FIG. 1.
Figure 9:
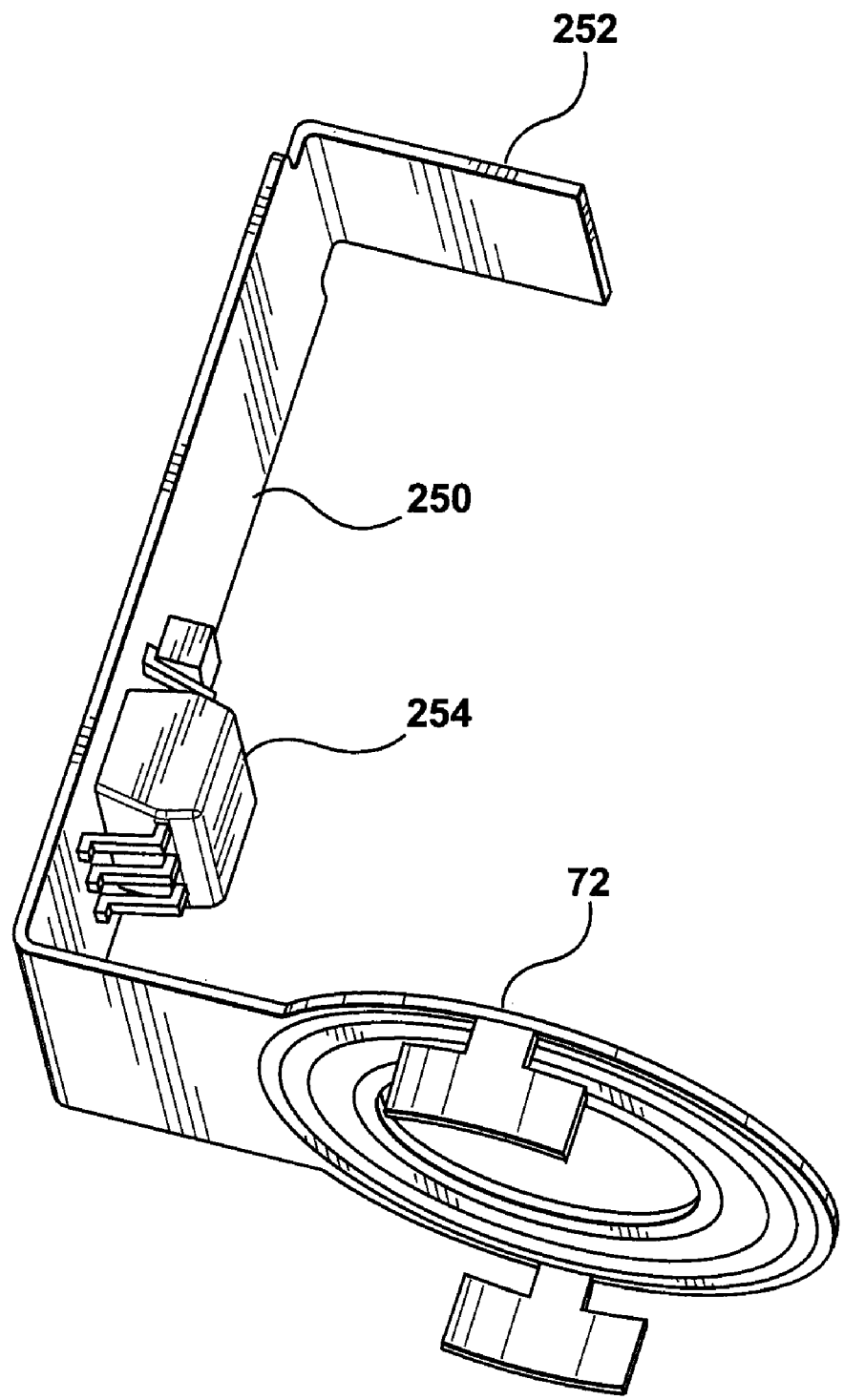
FIG. 9 is a perspective view showing a flex cable and temperature sensor for the imager of FIG. 1.
Figure 10:
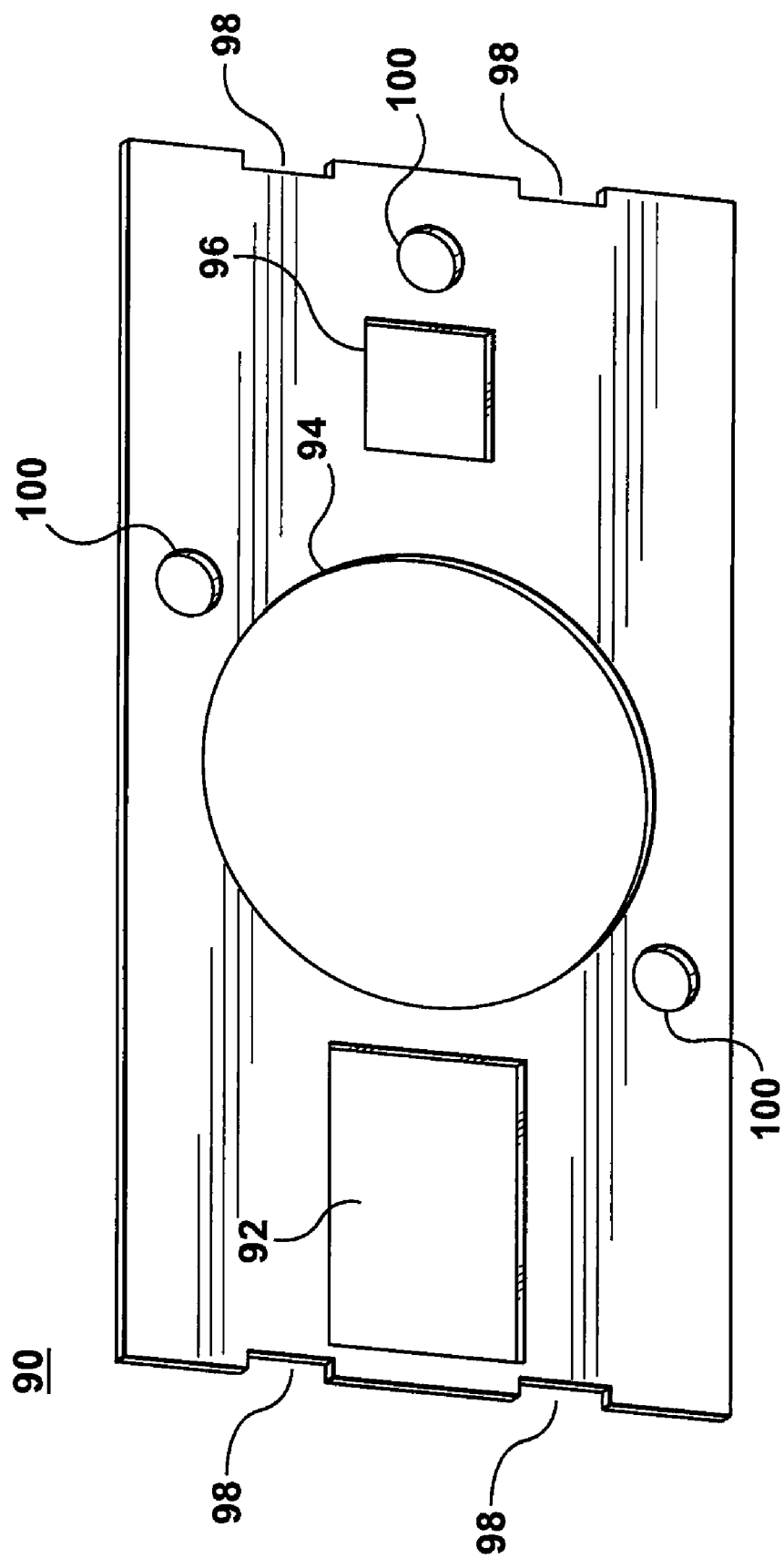
FIG. 10 is a perspective view of an illumination diffuser board for the imager of FIG. 1.
Figure 11:
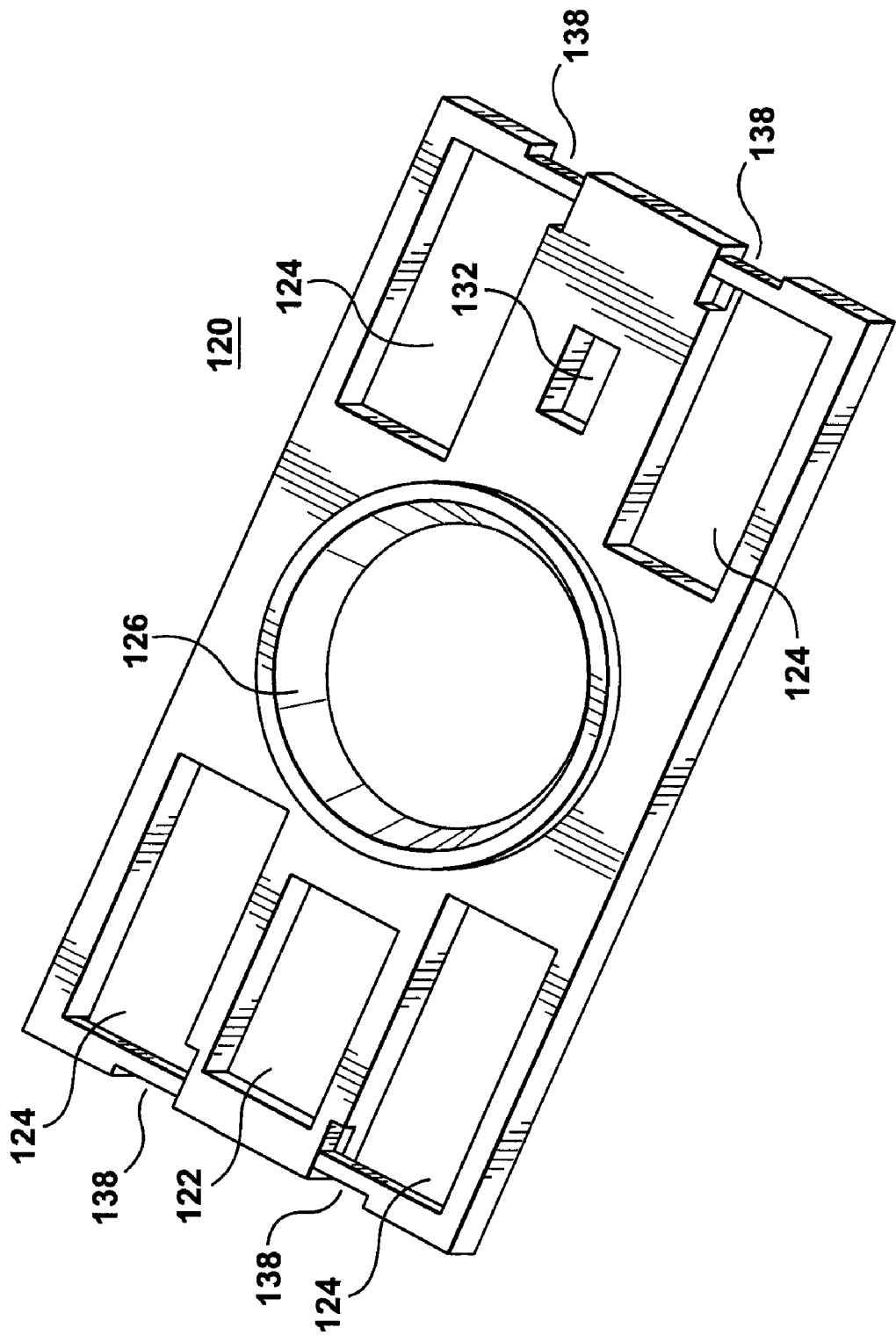
FIG. 11 is a perspective front view of a front panel for the imager of FIG. 1.
Figure 12:
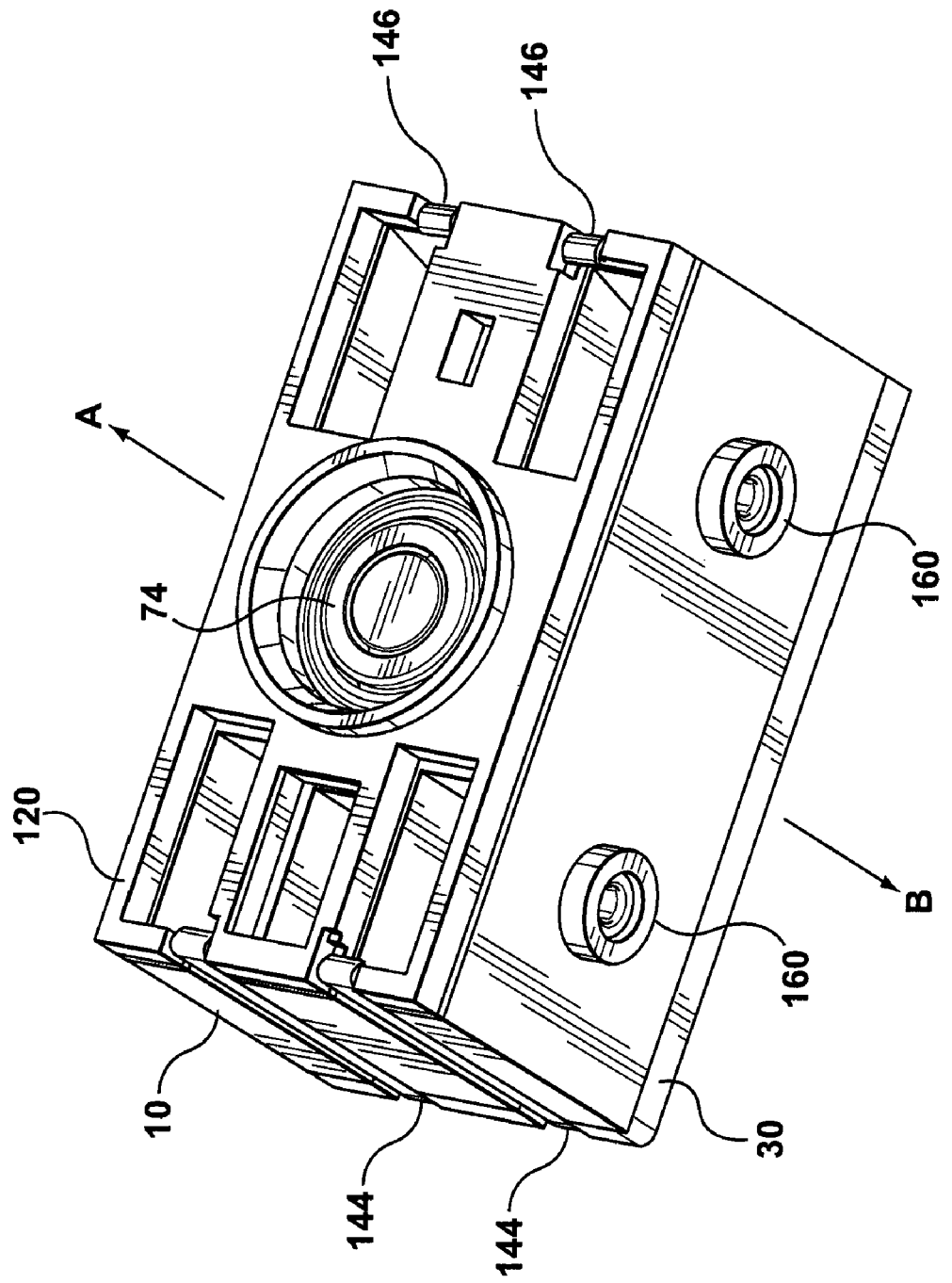
FIG. 12 is a perspective front view of the imager of FIG. 1.
Figure 13:
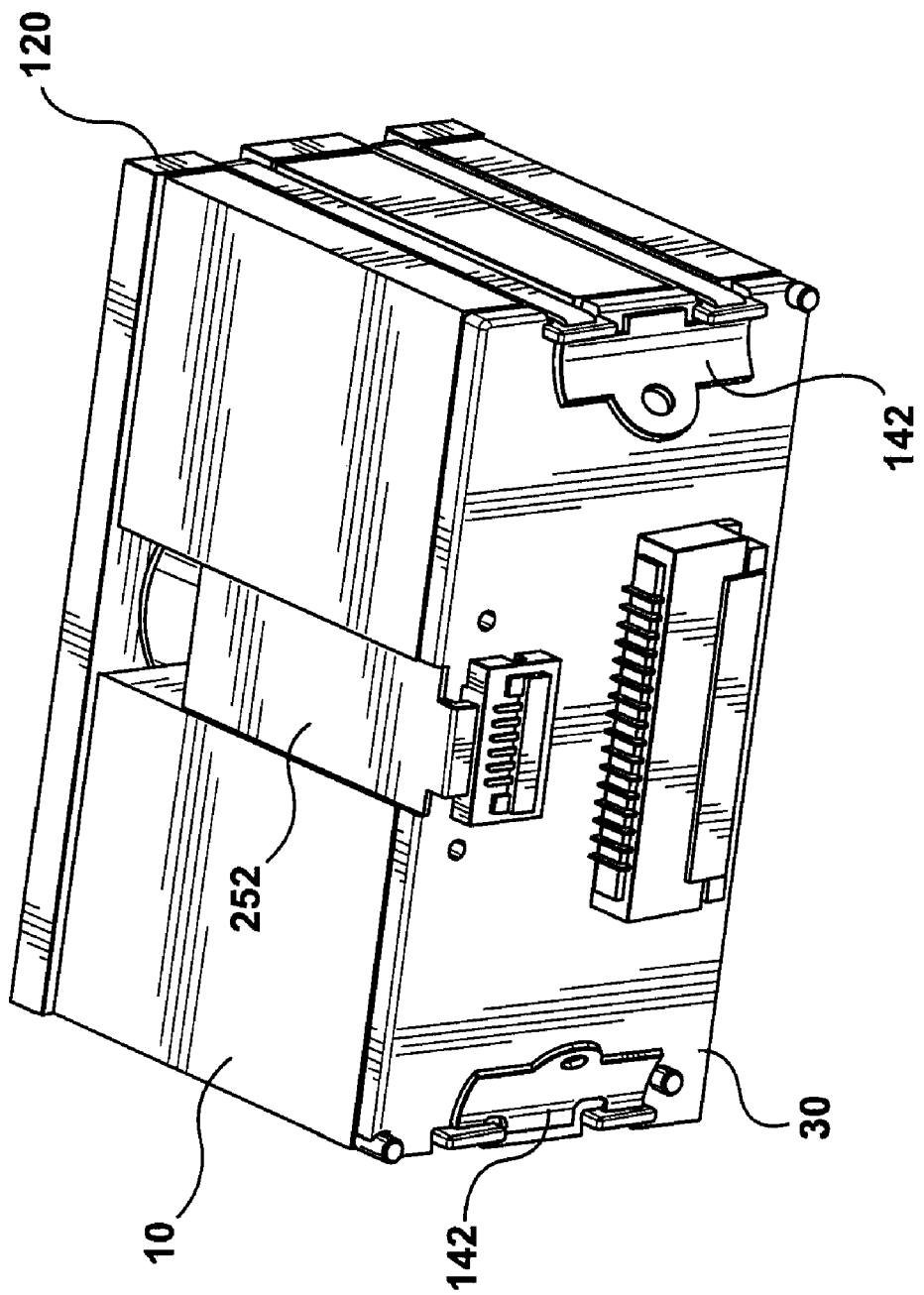
FIG. 13 is a perspective rear view of the imager of FIG. 1.

The variable focus lens element system 70 is based on the fluid (liquid) lens 74, flex circuit 72, temperature sensor 254, and focus bias generator on the PCB assembly 30 (FIGS. 7-9). The element 72 of the focus lens system 70 is placed on the cavity 18 created on the front surface of the housing 10. The element 72 of the focus lens system 70 has electrodes 76 and 78. The element 74 includes fluid(s) that respond (change focal length) to electrical stimulus and is placed in the element 72.

The element 72 has a flex circuit extended to form an arm 250. One end 252 of the arm 250 is bended. The temperature sensor 254 is attached to the arm 250, which is connected to at least one of the electrodes 76 and 78. In this example, the imager 2 implements active temperature compensation for the fluid lens to maintain fixed focus over temperature, based on the control from the temperature sensor 254. The temperature sensor 254 changes, for example, the bias voltage to compensate for temperature effects in order to maintain focus distance.

The variable focus lens element system 70 is an electrostatic device with extremely low power and relatively fast response. No mechanical moving parts are contained in the variable focus lens element system 70, which ensures high durability. The variable focus lens element system 70 is initially used for static distance, "presets". The focus of the fluid lens, i.e. the shape of the fluid lens, is continuously adjusted without using any motor. By changing the applied electric field, the surface of the lens can be changed, so as to smoothly transform the shape of the lens between convex and concave. The fluid lens may also be used dynamically as part of an active closed loop system.

The variable focus lens element system 70 replaces multiple imager variants based on focus distance (e.g., HD, ST, ULR, customs). The variable focus lens element system 70 accommodates a wider range of barcode feature sizes and reading ranges, including images focused @ infinity. The variable focus lens element system 70 is faster and more durable than discrete focus system (2 pt solenoid focus) or mechanical motor system.

The ambient light sensor 110 is mounted on the PCB 32. The ambient light sensor 110 senses light passing through the aperture 22 of the housing 10. The ambient light sensor 110 is a dedicated light sensor that is used in conjunction with the image sensor 34 for the first order (initial) exposure estimate. The ambient light sensor 110 implements fast ambient light measurement (e.g., uS) in a relatively short time period. The ambient light sensor 110 has a wide range of light sensitivity to complement the sensor's dynamic range.

The ambient light sensor senses reflection from the object and converts a light intensity to a digital signal that is proportional to the light intensity. The ambient light sensor 110 has, for example, a 16 bit range. The digital signal associated with the light intensity may be processed in the signal processor 500 (FIG. 15), and the first exposure estimate for the image sensor 34 is calculated.

The exposure of the image sensor 34 is initialized with the first exposure estimate. The first estimate by the ambient light sensor 110 minimizes the iterations for exposure calculation for the image sensor 34. Once the image sensor 34 is initialized with the first exposure estimate, the image sensor 34 senses reflection from the object. Based on the sensing result by the image sensor 34, a first image of an indicia on the object is obtained. The first image of the indicia may be sufficient to decode. No exposure iterations may be required before decoding. The ambient light sensor 110 is used for initial exposure setting only. Iterations, if required, will be based on actual image sensor reading(s) as well known in the art.

The ambient light sensor has a very wide dynamic range, and can measure light, for example, ranging from 0 to 100 Klux (dark-daylight), which allows a fast initial estimate of the ambient light. This estimate is used to determine the first exposure of the image sensor which has higher resolution but lower dynamic range. This permits an initial correct exposure with the image sensor.

Conventional systems iterate exposure calculation to determine appropriate exposure value, where each iteration may take 5-15 ms. By contrast, the ambient light sensor 110 is used for initial estimate for the exposure calculation to prevent multiple-interactions for exposure calculation. The imager 2 obtains the first image of an object using the image sensor 34 with the first estimate exposure. The first image is sufficient to decode, and the image sensor 34 may not require exposure iterations to obtain an appropriate image. Users of the imager 2 perceive it as adapting/responding faster. The ambient light sensor 110 reduces overall system operation time and thus power in portable equipment.

The front panel 120 is a non-reflective front surface that reduces secondary, internal housing reflections and from installation exit windows The front panel 120 is formed by material same as the housing 10. No special optical plastics are used so the front panel 120 is optically non reflective (matt). The front panel 120 has hollows (recesses, cut sections) 138 with which the binding system 140 is combined. The hollows extend from the sides of the front panel 120 to its top surface.

The front panel 120 includes secondary apertures (e.g., 122, 124, 126, 132) for targeting/aiming and illumination and light sensing. For example, the aperture 122 is aligned with the aperture 92 of the illumination diffuser 90; the apertures 124 are aligned with the apertures 14 of the housing 10; the aperture 126 is provided for the focus lens systems 60 and 70 and light sensor 32; and the aperture 132 is aligned with the aperture of 22 of the housing 10. The front panel acts as a cover to capture the targeting cylindrical lens 130, illumination diffuser 90, fluid lens 72, and flex circuit 74.

The combination of the front panel 120 and the housing 10 holds the cylindrical lens 130, the variable focus lens element system 70, the illumination diffuser 90 and the target shaping optics. The front panel 120 and the housing 10 shape optical paths (illumination, targeting, light sensing) by use of apertures placed after the lenses.

The binding system 140 includes side clips 142. Each clip 142 includes a resilient finger 144 and a snap end 146. The clips 142 are snap-fitted into each side of the housing 10, the PCB assembly 30, the ambient light sensor board 110, and the front panel 120. In the embodiment, the finger 144 is pulled outwardly and then released to hook the end 146 on the top part of the hollow 138 of the front panel 120.

Figure 14:
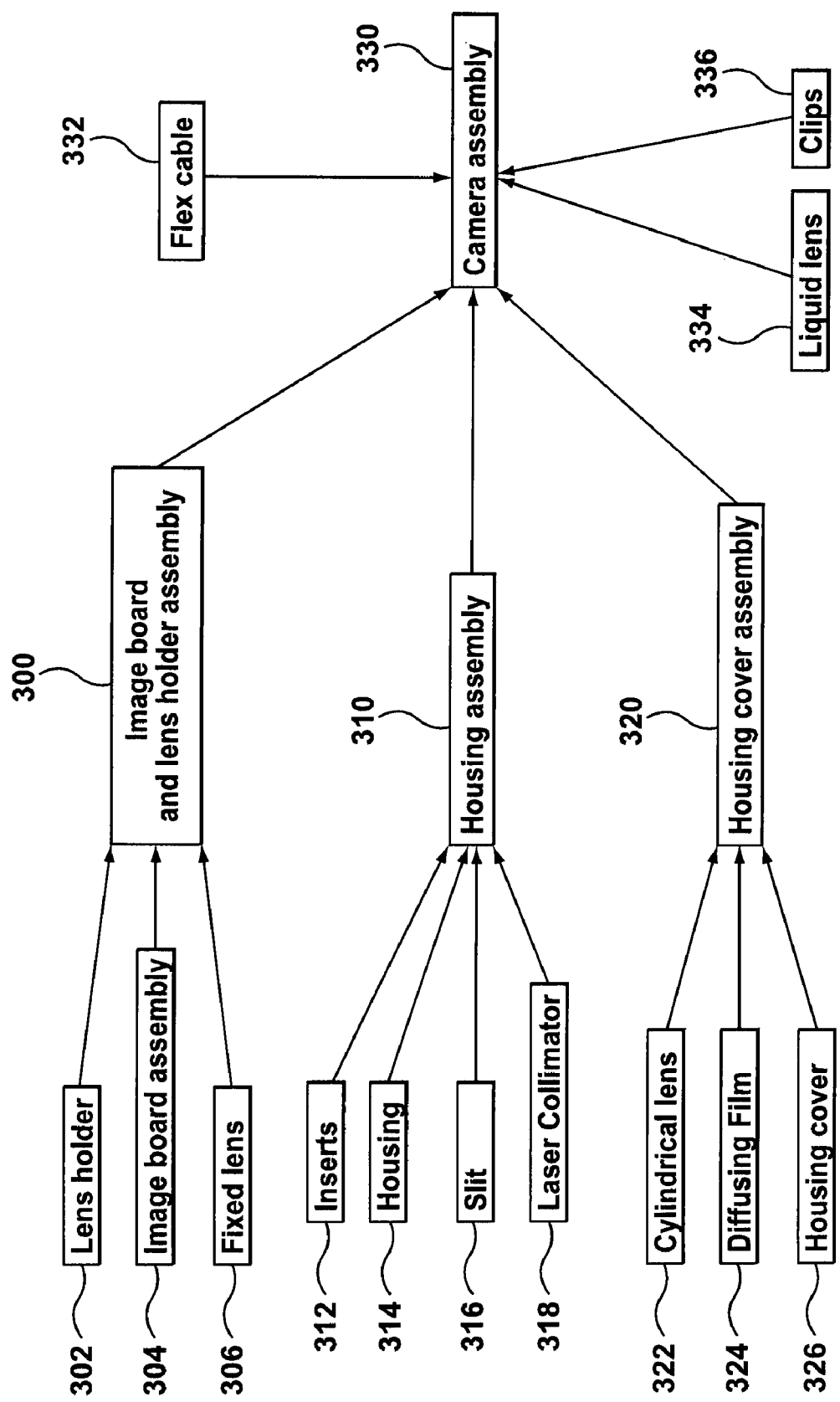
FIG. 14 is a flow chart showing a method of assembling the elements of the imager of FIG. 1.
Figure 15:
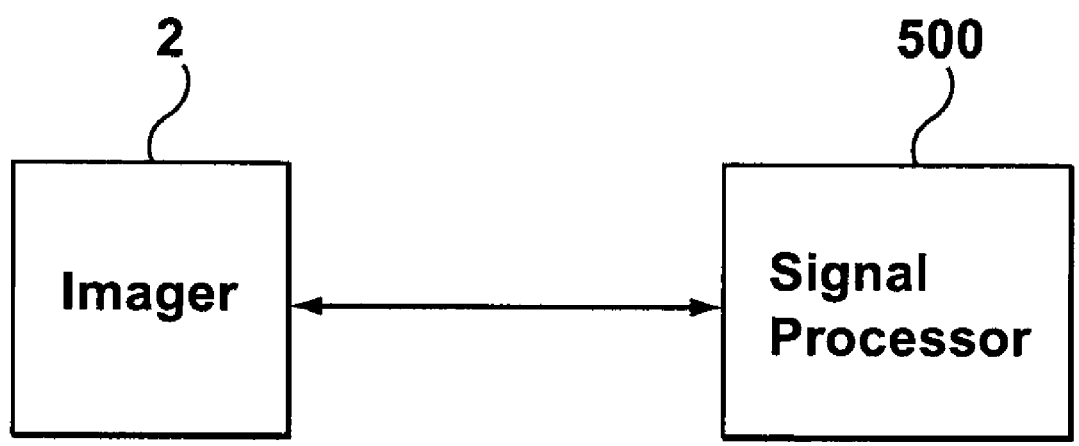
FIG. 15 is a block diagram illustrating the imager of FIG. 1 and a signal processor.

Referring to FIG. 14, assembling process for the imager 2 is described in detail. An image board and lens holder assembly is prepared (300). In this step, the lens holder 64, the PCB assembly 30 and the fixed focus lens 62 are assembled (302, 304, 306). When using the variable focus lens 72, the fixed focus lens 62 is not assembled. A housing assembly is prepared (310) In this step, the inserts 160, the housing 10, the slit 200 (220), and the laser collimator 80 are assembled (312, 314, 316, 318). When using the LED array 50, rather than the laser 80, the aperture plate 220 is mounted. A housing cover assembly is formed (320). In this step, the cylindrical lens 130, the diffusing film board 90, and the housing cover (front panel) 120 are assembled (322, 324, 326). A camera assembly (i.e., the imager 2) is then formed (330). In this step, the image board and lens holder assembly (300), the housing assembly (310), the housing cover assembly (320), a flex cable (332), the fluid focus lens (liquid lens) system 70 are assembled and combined by the clips (336). When using the fixed focus lens 62, the fluid focus lens system 70 is not assembled. The flex cable 332 is a small flexible printed circuit that carries a temperature sensor. It provides electrical connections between the main PCB, the temperature sensor 254) and the liquid lens (72).

Figure 16:
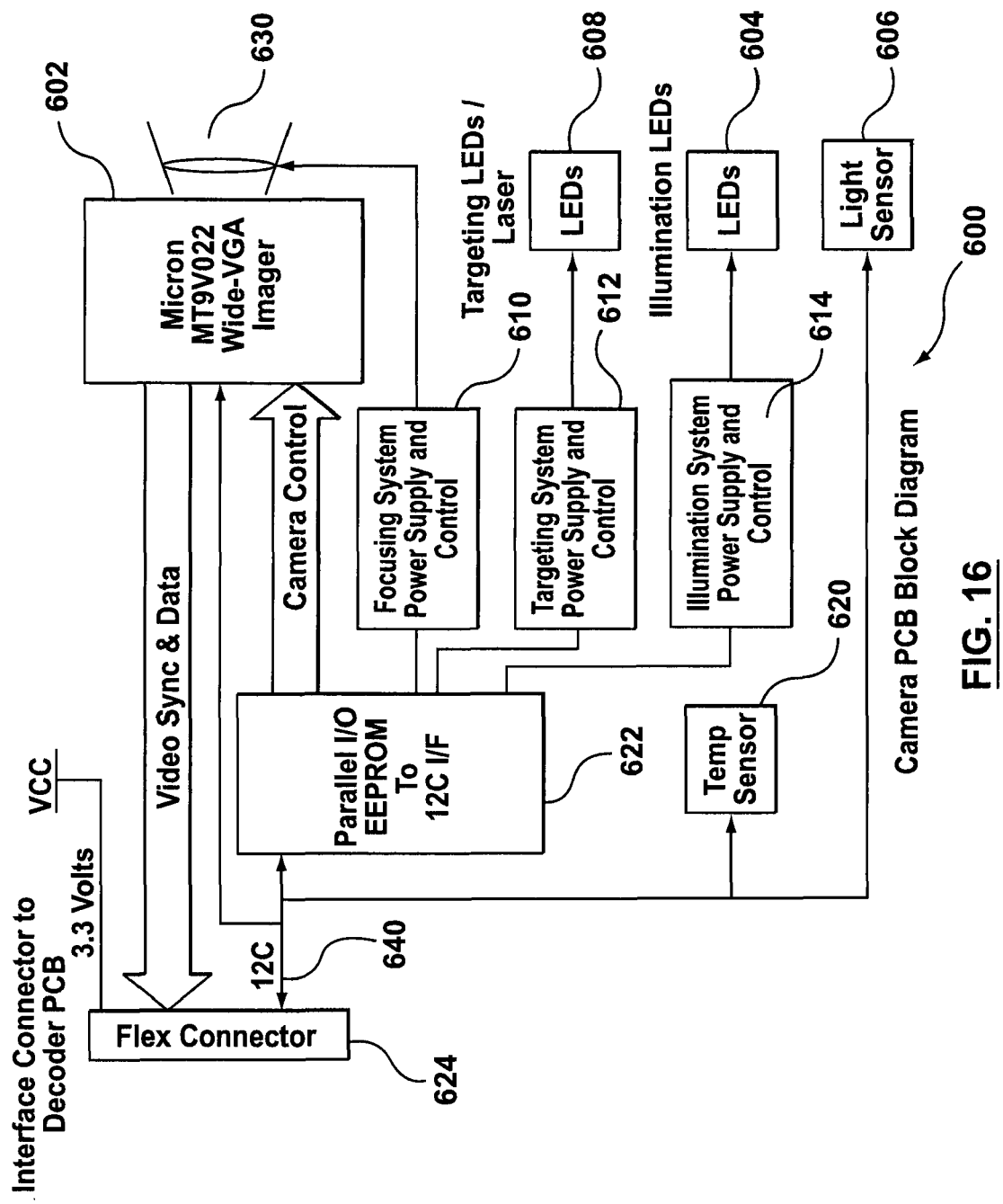
FIG. 16 is a block diagram illustrating an example of a PCB design applicable to the imager of FIG. 1.

FIG. 16 illustrates an example of a camera PCB design applicable to the imager 2 of FIG. 1. The camera PCB design of FIG. 16 provides the electronics to interface the imager 602 having an objective lens system 630 to a decoder. The PCB 600 includes circuitry for the targeting and illumination systems as well as the variable focus (e.g., 70 of FIG. 1) and ambient light sensor (e.g., 110 of FIG. 1). All these systems are interfaced to a single two-wire $I^2C$ bus 640. This single bus 640 reduces interconnection pin count.

The camera PCB 600 includes a targeting LEDs/laser 608, illumination LEDs 604 and a light sensor 606. The targeting LEDs/laser 608 may be the LED array 50 of FIG. 7 or the laser assembly 80 of FIGS. 4-5. The illumination LEDs 604 may be the illumination LEDs 56 of FIG. 7. The light sensor 606 may be the ambient light sensor 110 of FIG. 1.

The PCB 600 includes a focusing system power supply and control block 610 for controlling focus lens system 630 and supplying the power to the focus lens system 630, a targeting system power supply and control block 612 for controlling targeting LEDs/laser 608 and supplying power to the targeting LEDs/laser 608, and an illumination system power supply and control block 614 for controlling the illumination LEDs 604 and supplying power to the illumination LEDs 604.

The PCB 600 includes a block 662 for parallel I/O and EEPROM. For example, personality data may be stored in EEPROM, e.g., PCB rev., manufacturing date, serial number and focus calibration table. The block 662 provides control data/information/signals to the imager 602.

The imager 602 provides video synchronization and data to a flex connector 624. The flex connector 624 is an interface connector to a decoder PCB.

The imager 602, the parallel I/O and EEPROM block 622, the temperature sensor 620 and the light sensor 606 are connected via the bus 640.

One or more currently preferred embodiments have been described by way of example. It will be apparent to persons skilled in the art that a number of variations and modifications can be made without departing from the scope of the invention as defined in the claims.

What is claimed:

1. A targeting system for an imager, comprising:
    a light device having a plurality of light emitting diodes (LEDs), each for emitting light;
    a device for shaping the outputs of the plurality of LEDs into a targeting light, the device including on aperture plate having a single opening, the single opening shaping the outputs of the plurality of LEDs into the targeting light; and
    a housing including:
    a first side having a first aperture, the light device being accommodated in the first aperture,
    a second side opposite to the first side,
    a second aperture between the first side and the second side, and
    a recess arranged in the first side and being around the second aperture, the recess releaseably holding the aperture plate in front of the light device.

2. The targeting system according to claim 1, wherein the aperture plate in the recess is replaced with a different aperture plate to change the shape of the targeting light.

3. The targeting system according to claim 1, wherein the plurality of LEDs are aligned to form a linear array.

4. The targeting system according to claim 1, wherein the second side opposite to the first side includes a recess around the second aperture, for assembling a cylindrical lens for shaping the output from the light device.

5. The targeting system according to claim 4, wherein the cylindrical liens in the recess is replaced with another cylindrical lens to change the shape of the targeting light.

6. The targeting system according to claim 4, comprising a panel placed on the second side of the housing, for holding the cylindrical lens.

7. The targeting system according to claim 1, wherein the second side opposite to the first side is arranged for accommodating a holographic diffuser for changing the illumination angle of the light device.

8. The targeting system according to claim 7, comprising a panel placed on the second side of the housing, for holding the diffuser.

9. The targeting system according to claim 1, wherein the second aperture is arranged for accommodating a laser assembly, the targeting system being capable of using either the plurality of LEDs or the laser assembly as the targeting light.

10. The targeting system according to claim 1, wherein the housing comprises a third aperture between the first side and the second side, for an ambient light sensor.

11. A targeting system for an imager, comprising:
    a circuit board coupling to a light source, the light source being selected from a LED array having a plurality of LEDs and a laser assembly; and
    a housing including:
    a first side having a first opening, the first opening receiving the circuit board,
    a second side opposite to the first side, and
    an aperture between the first side and the second side, the laser assembly being accommodated into the aperture when selected; and
    a device for shaping the output from the light source, the device including:
    an aperture plate releaseably assembled in the first opening of the housing and on the aperture, the aperture plate having a single opening, the single opening shaping the outputs of the plurality of LEDs to a single targeting light.

12. The targeting system for an imager according to claim 11, wherein the second side opposite to the first side includes a recess around the aperture, for assembling a cylindrical lens for shaping the output of the light source.

13. The targeting system according to claim 12, comprising a panel placed on the second side of the housing, for holding the cylindrical lens.

14. The targeting system according to claim 11, wherein the second side opposite to the first side is arranged for accommodating a holographic diffuser for changing the illumination angle of the light source.

15. The targeting system according to claim 14, comprising a panel placed on the second side of the housing, for holding the diffuser.

16. The targeting system according to claim 11, wherein the housing comprises a third aperture between the first side and the second side, for an ambient light sensor.

* * * * *

UNITED STATES PATENT AND TRADEMARK OFFICE
CERTIFICATE OF CORRECTION

PATENT NO. : 8,033,471 B2 Page 1 of 1
APPLICATION NO. : 12/117450
DATED : October 11, 2011
INVENTOR(S) : Don Van Kerkhoven It is certified that error appears in the above-identified patent and that said Letters Patent is hereby corrected as shown below:

In column 9, line 50, being line 2 in claim 5, please delete "liens" and insert therefor -- lens --.

Signed and Sealed this
Fourteenth Day of February, 2012

David J. Kappos
*Director of the United States Patent and Trademark Office*